United States Patent

Ferris

[15] 3,670,007

[45] June 13, 1972

[54] AMINOMALONITRILE AND METHOD OF PREPARATION THEREOF

[72] Inventor: James P. Ferris, Troy, N.Y.

[73] Assignee: The Salk Institute for Biological Studies, San Diego, Calif.

[22] Filed: Nov. 21, 1967

[21] Appl. No.: 684,649

Related U.S. Application Data

[63] Continuation-in-part of Ser. No. 506,415, Nov. 4, 1965, abandoned.

[52] U.S. Cl. .....................260/465.5, 260/252, 260/307 R, 260/309, 260/465 E, 260/578
[51] Int. Cl. .........................................................C07c 121/20
[58] Field of Search...............................................260/465.5

[56] References Cited

OTHER PUBLICATIONS

Grishkevich–Trokhimovskii, et al., C.A., 19, 2810 (1925)
Oro, C.A., 56, 2450 (1962)
Ruske, et al., Ber., 91, 2,496– 2,504 (1958)
Beilstein, Vol. 4; p. 470 (1922)
Beilstein, Vol. 4; 2nd Supp; p. 891 (1942)
Calvin, " Chemical Evolution," 1961, pp. 24– 28

*Primary Examiner*—Joseph P. Brust
*Attorney*—Fitch, Even, Tabin & Luedeka

[57] ABSTRACT

The chemical aminomalononitrile and methods for making it comprising reacting oximinomalononitrile or phenazomalononitrile with approximately stoichiometric amounts of one of the group consisting of unoxidized aluminum, zinc and sodium dithionite. Formation of aminomalononitrile using zinc must take place in an acid solution. In each case, the reaction mixture is externally cooled until the initial exothermic reaction is substantially complete. Preferably, the aminomalononitrile so formed is isolated as a salt such as the hydrochloride, hydrobromide and toluenesulfonate.

10 Claims, No Drawings

AMINOMALONITRILE AND METHOD OF PREPARATION THEREOF

CROSS REFERENCES TO RELATED APPLICATION

This is a continuation-in-part of United States application entitled Aminomalononitrile and Method of Preparation Thereof, Ser. No. 506,415, Filed Nov. 4, 1965, and assigned to the instant assignee now abandoned.

BACKGROUND OF THE INVENTION

This invention relates to the formation of a new organic compound and methods for preparing same and, more particularly, relates to aminomalononitrile and methods for preparing same.

There has been an exceptional amount of interest in the formation of the compound aminomalononitrile by many workers concerned with pre-biological synthesis of amino acids, adenine (6-aminopurine) and other heterocyclics under primitive earth conditions. See for example, M. Calvin "Chemical Evolution," University of Oregon Press, Eugene, Oregon, 1961, pages 24–28. Calvin has reported the previously known phenomenon of the formation of adenine spontaneously in ammoniacal cyanide solutions. The reactive pathway to the formation of adenine is postulated, by Calvin, as proceeding via the formation of the intermediate compounds, aminomalononitrile, then 4-amino-5-cyanoimidazole, and finally to the adenine itself. Since adenine is one of the most important of the heterocyclic bases which are constituents of nucleic acid, the understanding of the reaction mechanism by which adenine is formed is extremely important in providing a deeper insight into basic chemical structure dealing with the origin of life on earth. The isolation of aminomalononitrile in a stable form (either as the compound itself or as a stable salt form) has therefore been a long sought but hitherto unattainable goal. The aim of the isolation of aminomalononitrile is to attempt to shed some deeper insight into the reaction mechanism involved in the pre-biological organic synthesis.

The formation of aminomalononitrile has been reported by workers in the art but has in all cases been disproven. Thus, the formation of aminomalononitrile by polymerizing hydrogen cyanide was reported by Lange (BER. 1873,6,99) but Bedel (Compt. rend.1923,176,178) showed by means of ebullioscopic measurements that the product was in fact a tetrameride; further work, notably by Hinkel et al (J.Chem.Soc.,1937,1433; 1939, 49; 1940,1206) showed it to consist of aminoiminosuccinonitrile. A.H. Cook and E.H. Smith (J.Chem.Soc. 3001 (1949)) reported attempts to prepare aminomalononitrile by reducing oximinomalononitrile or phenazomalononitrile by various means. Attempts were all stated to be unsatisfactory by the authors. Calvin, also in the work cited earlier, had a passing reference to the isolation of aminomalononitrile at some stage in the process of spontaneous formation of adenine from ammoniacal solution of hydrogen cyanide, but no satisfactory evidence of the isolation of the compound has been presented, and in communication with Calvin himself, it appears that no satisfactory evidence of the isolation of aminomalononitrile was obtained.

Further, preparations of aminomalononitrile by Ruske et al., (BER., 91, 2496 (1958)) and J. Vaughn (J.New Zealand Inst. Chem., 22, 149 (1958)) was shown not to have occurred by J.P. Ferris and L.E. Orgel, (J.Org.Chem., 30, 2365 (1965)).

SUMMARY OF THE INVENTION

This invention consists in the isolation and preparation of aminomalononitrile and salts thereof by means of the reduction of either oximinomalononitrile (HO—N = C—(CN)$_2$) or phenazomalononitrile

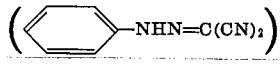

under carefully controlled conditions in the presence of one of the group consisting of unoxidized aluminum, zinc in acid media, potassium dithionite and sodium dithionite. Although aminomalononitrile itself may be isolated, it is preferable to isolate aminomalononitrile as a salt, for example, the hydrochloride, hydrobromide and toluene-sulfonate salts.

Aminomalononitrile has definitely been prepared and isolated by the method of this invention. This has been verified by a number of tests, a description of which is set forth hereafter.

It has been found that adenine can be produced, using as an intermediate, aminomalononitrile prepared in accordance with this invention. The problems of forming aminomalononitrile have been overcome and the making of products using aminomalononitrile as an intermediate is now an accomplished fact.

DESCRIPTION OF THE PREFERRED EMBODIMENT

In general, this invention consists in the preparation and isolation of aminomalononitrile and salts thereof by means of the reduction of either oximinomalononitrile (HON = C(CN)$_2$) or phenazomalononitrile

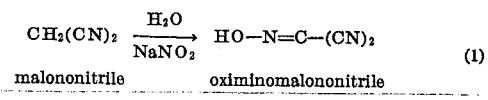

under carefully controlled conditions. The reduction of the malononitrile compound preferably proceeds in the presence of specific amounts of unoxidized aluminum, zinc, potassium dithionite or sodium dithionite.

The formation of oximinomalononitrile and phenazomalononitrile from malononitrile (CH$_2$(CN)$_2$) is first set forth.

The preparation of oximinomalononitrile will first be described. The oximinomalononitrile is prepared by modification of the method of Ponzio, Gazz.Chim.Ital., 61, 561 (1931) from malononitrile, as follows:

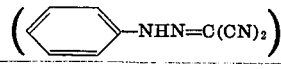

(1)

malononitrile      oximinomalononitrile

Twenty-five grams (0.38 moles) of malononitrile was dissolved in a mixture of 20 milliliters of water and 100 ml. of acetic acid in a 1 liter flask equipped with a stirrer, thermometer and a solids addition funnel. The solution was cooled to −10° C. with a dry ice acetone bath and 50 grams (0.72 moles) of granulated sodium nitrite was added in approximately 2 grams portions over a 30 minute period while the temperature in the flask was maintained at between 0° and −10° C. After the addition of the sodium nitrite was completed, a wet ice bath was used to maintain the temperature of the flask below 5° C. while stirring for 4 hours. At the end of this period, 400 ml. of tetrahydrofuran and 400 ml. of ether were added separately to the flask and the resulting mixture was stored at −40° C. overnight. Thereafter, the mixture was filtered rapidly and the solid was washed with a solution of 200 ml. tetrahydrofuran and 200 ml. of ether. The filtrate was concentrated by distillation using a water aspirator and a bath temperature of 40° C. to a volume of 250 ml.

Phenazomalononitrile may be prepared from malononitrile by the method of C.Y. Curtin and C.S. Russell, J.Am.Chem.Soc. 73, 4975 (1951)

The oximinomalononitrile is reduced in its ethereal solution to the aminomalononitrile in the presence of between about a 1.3:1 molar ratio of aluminum (whose surface is not oxidized) to a maximum of about 4:1 molar ratio of aluminum to oximinomalononitrile, and also in the presence of water. The reduction reaction is believed to proceed in accordance with the following:

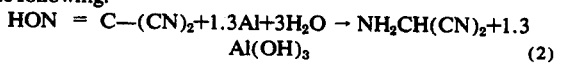

(2)

It will thus be seen that the stoichiometric minimum of aluminum that may be successfully employed is a 1.3:1 molar ratio of aluminum to oximinomalononitrile (or malononitrile). Amounts of aluminum below this molar ratio may be employed but the yields will be very small.

Optimum yields up to 80 percent are obtained at about a 2:1 molar ratio of aluminum to oximinomalononitrile in the presence of a minimum water to oximinomalononitrile molar ratio of 3:1. The compound of this invention $NH_2CH(CN)_2$ is not obtained, however, in the presence of a large excess of aluminum, the upper limit of aluminum employed in the reduction being about a 4:1 molar ratio of aluminum to oximinomalononitrile.

The amount of water present in ethereal solution is preferably present in the amount of about a 3:1 molar ratio of water to oximinomalononitrile; however, the water may be present in large excess, e.g., a 5 or 6:1 molar ratio, and only a slight decrease in yield results. If the amount of water is substantially less than the 3:1 molar ratio above mentioned, the yield is substantially decreased, about a 2:1 ratio being the minimum amount employed.

The reduction reaction (2) proceeds, preferably, at or below the reflux temperature of the reaction mixture. Because of the extreme exothermic characteristic of this reaction, the reaction vessel is preferably initially immersed in a dry ice - acetone bath to cool the reaction mixture to a temperature between about −15° C. and about −30° C. until the reaction is substantially complete. Thereafter, external heat can be applied to the reaction mixture to raise it to the reflux temperature until the reaction is complete. The temperature at which the reaction is conducted is not critical; higher temperatures could be employed if the reaction mixture were sealed off.

The reaction (2) proceeds, preferably, in ethereal solution, and while diethyl ether is usually employed, any of a great number of ethers, such as ethyl methyl ether, ethyl butyl ether, ethyl isopropyl, or diisopropyl ether may also be employed.

It is also preferable to employ a small quantity of tetrahydrofuran (THF) in the ethereal solution in order that the either and water be rendered completely compatible. The presence of THF is not essential for the reduction reaction to proceed, as stirring of the reaction mass is maintained throughout the period of the reaction.

In order to insure that the aluminum is available to react, and that it is not coated with an oxide film, it is preferred to prepare an aluminum amalgam which dissolves any oxide coating from the aluminum. This is readily done by amalgamating aluminum foil with mercuric chloride ($HgCl_2$). For example, aluminum foil is cut in half-inch squares and is covered with a 5 percent aqueous solution of mercuric chloride for about 30 seconds. At the end of this time, the mercuric chloride is decanted and the aluminum amalgam is washed with water. Because of the high reactivity of the aluminum amalgam with water and air, any water employed to wash the amalgam is preferably removed with organic solvent, for example, tetrahydrofuran and ethanol, and the amalgam is preferably covered with an organic solvent prior to its reaction with the oximinomalononitrile or phenazomalononitrile.

The reaction proceeds generally to is optimum yield within about 45 to 60 minutes. The ethereal solution will then contain approximately 80 percent of the theoretical available amount of aminomalononitrile ($NH_2CH(CN)_2$).

The formation of aminomalononitrile from oximinomalononitrile in the presence of zinc will next be described. The reduction reaction is believed to proceed in accordance with the following equation:

$$4HCl + 2Zn + HON = C(CN)_2 \rightarrow NH_2CH(CN)_2 + 2ZnCl_2 + H_2O \quad (3)$$

From equation (3), it will be seen that the stoichiometric minimum of zinc that may be successfully employed is a 2:1 molar ratio of zinc to oximinomalononitrile. Amounts of zinc below this molar ratio may be employed but the yields will be very small. Molar ratios of zinc to oximinomalononitrile substantially in excess of the stoichiometric amounts may be used. However, it is preferred to use a zinc to oximinomalononitrile molar ratio of about 2.5:1.

The reduction of oximinomalononitrile in the presence of zinc must take place in an acid medium, that is, in a medium having a pH less than 7. Above pH 7, aminomalononitrile is not formed. Provided the pH of the reaction mixture is below pH 7, there appears to be little effect on the rate of production of aminomalononitrile and and on the amount of aminomalononitrile produced when the pH of the reaction mixture is changed within the acid pH range.

The zinc may be added to the reaction mixture in any of a number of physical forms, such as, for example, thin strips, dust, and flakes. Preferably, the zinc is added as a dust because this provides a maximum surface for the reaction per unit amount of zinc. The acid used in the reaction mixture may be any acid which is capable of maintaining an acid pH throughout the course of the reaction. Thus, the acid may be an organic acid such as acetic acid or an inorganic acid such as hydrochloric acid. The acid may be either a weak or a strong acid.

The reaction of oximinomalononitrile with acidified zinc, that is, zinc in an acid solution, is exothermic. Therefore, it is preferable to cool the reaction mixture at least during the initial phase of the reaction until the more violent phase of the reaction is complete. The reaction mixture is cooled substantially below the reflux temperature of the reaction mixture to a temperature of about 0° C. The reaction continues until the reaction mixture becomes colorless, thereby indicating that all of the oximinomalononitrile, which has some color, has been reacted.

The formation of aminomalononitrile from oximinomalononitrile using sodium dithionite as the reducing agent will now be described. The reduction reaction is believed to proceed in accordance with the following equation:

$$2Na_2S_2O_4 + HON=C(CN)_2 \xrightarrow[\text{ether}]{H_2O} NH_2CH(CN)_2 + 4NaHSO_3 \quad (4)$$

To place both the sodium dithionite and oximinomalononitrile in solution so that the reaction can proceed, it is preferable to employ an ether-water solution although other organic solvents which are compatible and miscible with water (required to dissolve the sodium dithionite) may be used.

From equation (4), it will be seen that the stoichiometric minimum of sodium dithionite that may be successfully employed is a 2:1 molar ratio of sodium dithionite to oximinomalononitrile. Amounts of sodium dithionite below this molar ratio may be employed but the yields of aminomalononitrile will be quite small. Molar ratios of sodium dithionite to oximinomalononitrile substantially greater than the stoichiometric ratio, for example, 3:1, may be used.

In place of sodium dithionite, aminomalononitrile may be formed using potassium dithionite or other soluble dithionite salts.

The reaction of sodium dithionite with oximinomalononitrile is also highly exothermic. Therefore, it is preferred to cool the reaction mixture at least during the initial phase of the reaction. Preferably, the reaction mixture is cooled to a temperature of about 0° C. After the reaction is substantially complete, the reaction mixture may be warmed up to its reflux temperature until the reaction is complete.

The formation of aminomalononitrile from phenazomalononitrile using any of the reducing agents unoxidized aluminum, zinc or sodium dithionite is substantially the same as described for the formation of aminomalononitrile from oximinomalononitrile. The primary difference is that aniline is formed when the starting material is phenazomalononitrile. The formation of aniline requires the separate step of separating the aniline from the aminomalononitrile upon completion of the reaction.

As described, aminomalononitrile can be formed from either oximinomalononitrile or from phenazomalononitrile in the presence of one of the group of reducing agents consisting of unoxidized aluminum, zinc and sodium dithionite. Further, as described, each of the reactions forming aminomalononitrile takes place in an aqueous medium either because water is required for the reaction (as when using aluminum), or because water is employed as a solvent (as when using sodium dithionite and zinc in acid media). The amount of water employed in the aluminum reaction method is relatively small — substantially only stoichiometric amounts of water being required — whereas substantially greater amounts of water are present in the zinc and sodium dithionite reactions because water is therein used as a solvent. The result is that aminomalononitrile and salts thereof (which are quite soluble in water as are other components of the reactions) are readily removed from the post-reaction solution in the aluminum reaction method whereas aminomalononitrile and salts thereof are removed only with greater difficulty from the post-reaction solutions in the zinc and sodium dithionite methods. Therefore, the use of aluminum as the reducing agent is preferred.

Using well-known separation techniques, aminomalononitrile can be isolated from its reaction solution resulting from any of the foregoing methods. Aminomalononitrile will remain stable at low temperatures of the order of −70° F. for long periods of time and will also remain stable in ethereal solution at room temperature for approximately 24 hours or perhaps longer. However, because it is a very low melting solid which polymerizes spontaneously, it is preferably isolated in salt form. For example, aminomalononitrile is readily isolated as a salt such as the hydrochloride, hydrobromide and toluenesulfonate salts. Formation of such salts is readily accomplished by adding a 1:1 molar ratio (or grater) of the respective acid of the salt to be formed to oximinomalononitrile solution. In the formation of many varying salts of aminomalononitrile, the salts of strong acids are preferably utilized as the salts of weak acids may not precipitate the aminomalononitrile.

As proof of the production of the aminomalononitrile, the p-toluenesulfonate salt thereof was isolated in accordance with the general procedures set forth herein and also following the specific teachings of Example 1 of this disclosure. The m.p. of the isolated compound was 175°–176° C. and was found to have the following breakdown: C, 47.20; H, 4.39; N 16.52, whereas the requirement for the formula $C_{10}H_{11}N_3O_3S$ is C, 47.41; H, 4.38; N 16.59. Further, the aminomalononitrile prepared in accordance with my invention had infrared, ultraviolet and nuclear magnetic resonance spectra in agreement with the proposed structures.

Further treatment of aminomalononitrile with acid anhydrides yielded the corresponding oxazoles. Thus, acetic anhydride in formic acid yielded compound A set forth below where R=H

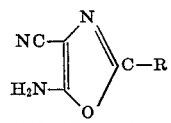

Compound A

The m.p. of compound A is 184°–186° C. ($C_4H_3N_3O$: C,44.04; H, 2.77; N, 38.52. Found: C, 44,42; H, 3.20; N, 37.89); acetic anhydride (R=CH₃)m.p. 153°–155°, ($C_5H_5N_3O$: C, 48.78; H, 4.09; N, 34.13. Found: C, 48.77; H, 4.35; N, 33.91); propionic anhydride gave A (R=$C_2H_5$) m.p. 148°–149 °, ($C_6H_7N_3O$: C, 52.55; H, 5.14; N.30.64. Found C, 52.32; H, 5.29; N, 30.55), and benzoic anhydride gave A (R=$C_6H_5$) m.p. 241°–243°. The oxazole structure was proved by direct comparison of A (R=$C_6H_5$) with a sample prepared by a published procedure of H.T. Clarke, J.R. Johnson and R. Robinson, as set forth in "The Chemistry of Pencillin," Princeton University Press, Princeton, N.J., 1949, p. 720.

As specific proof of the utility of aminomalononitrile, the synthesis of adenine will be set forth. Aminomalononitrile (as prepared in accordance with Example 1 hereof) is converted to an imidazole ring system by the condensation of the aminomalononitrile p-toluenesulfonate salt with an approximately 1:1 molar ratio of formamidine acetate in ethanol at about 100° C. A 23 percent yield of Compound B,

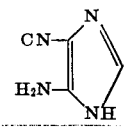

Compound B (4-amino-5-cyanoimidazole) as the p-toluenesulfonate was produced. (m.p. 168°–169° ($C_{11}H_{12}N_4O_3S$: C, 47.13; H, 4.31; N, 20.00. Found: C, 46.90; H. 4.54; N, 19.62).

Compound B was then treated with an approximately 1:1 molar ratio of formamidine acetate in boiling methoxyethanol to yield adenine (68% m.p. 357°–360° C.).

Another compound of interest prepared from aminomalononitrile is 4-aminoimidazole-5-carboxamide set forth below as Compound C.:

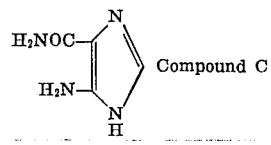

Compound C

A certain amount of Compound C is formed by hydrolysis of aminomalononitrile prior to its condensation to Compound B.

Specific examples of this process are set forth below and are not to be construed as limiting this invention.

EXAMPLE 1

Preparation of Aminomalononitrile Toluene Sulfonate Using Aluminum Amalgam as the Reducing Agent A 51.0 gm. (0.252 mole) sample of malononitrile oxime silver salt, prepared by the method of Ponzio, (cited earlier) was used for the preparation. The free oxime was obtained by using 100 ml. of 8N $HNO_3$ at room temperature. This mixture was extracted with about 300 ml. ether.

A 14.0 gm. (0.52 mole) sample of cut-up aluminum foil was amalgamated with about 150 ml. of 5% $HgCl_2$. This was washed twice with about 150 ml. of each of the following respectively; $H_2O$, methanol, ether and THF. This was then covered with THF in a 1 liter flask equipped with stirrer and reflux condenser.

The oxime-ether solution, prepared above, was now added slowly to the amalgam. The temperature of the reaction mixture was maintained just below the reflux temperature with an ice bath. After completion of the addition stirring was continued for about 15 minutes. Water was now added, 25 ml. (1.4 moles), slowly and with constant stirring to complete the reaction. A dry ice acetone bath was utilized to prevent the reaction from becoming too vigorous.

After completion of the water addition, the reflux temperature was maintained for 50 minutes, stirring being maintained throughout this period. The solution was then filtered and the solids washed with ether and THF respectively until the washings were essentially colorless. The volume of ether-THF was then evaporated in vacuo until about to one-half volume, 150-200 ml.

The solution now contains aminomalononitrile, which, as stated earlier, is stable. To this concentrated solution was added 40.0 gm. (0.232 moles) of p-toluene-sulfonic acid suspended in about 300 ml. of ether which was in the form of two liquid layers. A precipitate was obtained almost immediately. The total volume was brought up to about 1 liter before cooling and filtering. The precipitate ($H_2N$—CH — $(CN)_2$ $CH_3C_6H_4SO_3H$) was washed with ether and dried to yield 31.4 gms. (0.125 moles) or 49.5 percent.

EXAMPLE 2

Preparation of Aminomalononitrile Toluene Sulfonate

The procedure of Example 1 was followed but a reduced amount of water was employed, viz., 15 ml. (0.84 moles). A slight increase in yield occurred.

EXAMPLE 3

Preparation of Aminomalononitrile Hydrochloride

The procedure of Example 1 was followed, but instead of adding toluene sulfonic acid, a solution of dry hydrogen chloride in ether was added to the concentrated ether solution containing aminomalononitrile until no further formation of a precipitate was evident. The precipitated aminomalononitrile hydrochloride was collected by filtration.

EXAMPLE 4

Preparation of Aminomalononitrile Hydrogen Bromide

The procedure of Example 1 was followed, but instead of adding toluene sulfonic acid, a solution of dry hydrogen bromide in ether was added to the concentrated ether solution containing aminomalononitrile until no further formation of a precipitate was evident. The precipitated aminomalononitrile hydrogen bromide was collected by filtration.

EXAMPLE 5

Preparation of Aminomalononitrile Toluene Sulfonate

An 0.252 mole sample of phenazomalononitrile prepared by the method of Curtin and Russell (cited earlier) was used for the preparation and dissolved in about 300 ml. of THF.

A 14.0 gm. (0.52 mole) sample of cut-up aluminum foil was amalgamated with about 150 ml. of 5% $HgCl_2$. This was washed twice with about 150 ml. of each of the following respectively; $H_2O$, methanol, ether and THF. This was then covered with THF in a 1 liter flask equipped with stirrer and reflux condenser.

The phenazomalononitrile-THF solution, prepared above, was now added slowly to the amalgam. The temperature of the reaction mixture was maintained just below the reflux temperature with an ice bath. After completion of the addition, stirring was continued for about 15 minutes. Water was now added, 15 ml. (0.84 moles), slowly and with constant stirring to complete the reaction.

After completion of the water addition, the reflux temperature was maintained for 50 minutes, stirring being maintained throughout this period. The solution was then filtered and the solids washed with THF until the washings were essentially colorless. The volume of THF was then evaporated in vaccuo until about to one-half volume, 150–200 ml.

To this concentrated solution was added 40.0 gm. (0.232 moles) of p-toluene sulfonic acid suspended in about 300 ml. of THF. A precipitate was obtained almost immediately. The total volume was brought up to about 1 liter before cooling and filtering. The precipitate ($H_2N$—$CH_2(CN)_2$ $CH_3C_6H_4SO_3H$) was washed with THF and dried.

EXAMPLE 6

Preparation of Aminomalononitrile From Oximinomalononitrile using Zinc as the Reducing Agent To a solution of oximinomalononitrile in tetrahydrofuran was added 6N hydrochloric acid. Zinc dust was added to that solution in small amounts and the mixture was cooled. Addition of zinc was continued until the reaction mixture became colorless. After an additional 5 minutes, the mixture was chromatographed on Whatman 3MM paper using tetrahydrofuran as solvent. The aminomalononitrile was identified by its blue color with the Folin reagent, its Rf value and by comparison with an authentic sample chromatographed on the same paper.

EXAMPLE 7

Preparation of Aminomalononitrile from Phenazomalononitrile using Zinc as the Reducing Agent Phenazomalononitrile (2.5 gm.) was dissolved in 25 ml. of tetrahydrofuran and to this solution was slowly added 50 ml. of 6N hydrochloric acid to which a small amount of zinc had been added. The zinc was periodically added over a 10 to 15 minute period until the reaction was complete. Aminomalononitrile was identified as the major product in the reaction mixture by its Rf value on Whatman 3MM paper using tetrahydrofuran as solvent. It also exhibited the characteristic blue color of aminomalononitrile with the Folin reagent.

EXAMPLE 8

Preparation of Aminomalononitrile from Oximinomalononitrile using Sodium Dithionite as the Reducing Agent To an aqueous solution (50 ml.) of oximinomalononitrile (0.10 moles) was added sodium dithionite (0.20 moles). This yielded a black precipitate immediately with the evolution of gases. The mixture was cooled with an ice bath. After the reaction was complete, the aqueous layer was extracted with ether and the product was precipitated by the addition of toluene sulfonic acid.

The precipitate so formed was collected and washed with an ether-tetrahydrofuran solution. The compound was characterized as hving a melting point of 173°–174° C. and IR = RM–145.

EXAMPLE 9

Preparation of Aminomalononitrile from Phenazomalononitrile using Sodium Dithionite as the Reducing Agent About 3.2 grams (0.017 moles) of phenazomalononitrile was dissolved in 25 ml. of ether. Five milliliters of water was added as a second layer. To this was slowly added approximately 10 gm. (0.049 moles) of sodium dithionite with stirring. After about 15 minutes, the separate phases were chromatographed in a tetrahydrofuran-water solvent. The aqueous phase when sprayed definitely showed aminomalononitrile with Folin reagent. The ether phase showed only the yellow spot of phenazomalononitrile and possibly some aniline.

I claim:

1. A process for preparing aminomalononitrile which comprises:

a. reacting in an aqueous medium and in substantially stoichiometric proportions a malononitrile selected from the group consisting of oximinomalononitrile and phenazomalononitrile with a reducing agent selected from the group consisting of aluminum, sodium dithionite, potassium dithionite and acidified zinc, said aqueous medium including a water miscible, organic solvent for said malononitrile and water, and said reaction being carried out at a temperature below the reflux temperature of the reaction mixture for a sufficient period of time to reduce said malononitrile to aminomalononitrile;

b. separating aniline from said aminomalononitrile where phenazomalononitrile is the starting material; and c. separating aminomalononitrile from the reaction mixture.

2. A process in accordance with claim 1 wherein a strong acid, selected from the group consisting of hydrogen chloride, hydrogen bromide and p-toluene sulfonic acid, is added to said aminomalononitrile formed, from said reaction mixture, to produce the corresponding salt thereof.

3. A process for preparing aminomalononitrile which comprises reacting an etheral solution of a malononitrile selected from the group consisting of oximinomalononitrile and phenazomalononitrile with aluminum and water, the initial molar ratio of aluminum to malononitrile being between about 1.3 to 1 and about 4 to 1 and the initial molar ratio of water to malononitrile being at least about 2 to 1, said reaction being carried out at a temperature below the reflux temperature of the reaction mixture.

4. A process in accordance with claim 3 wherein the aluminum is in the form of an amalgam with mercury and the initial molar ratio of water to malononitrile is between about 3 to 1 and about 6 to 1.

5. A process for preparing aminomalononitrile salts which comprises:
   a. reacting an ethereal solution of a malononitrile selected from the group consisting of oximinomalononitrile and phenazomalononitrile with aluminum and water, the initial molar ratio of aluminum to malononitrile being between about 1.3 to 1 and about 4 to 1, the initial molar ratio of water to malononitrile being between 3 to 1 and about 6 to 1, said reaction being carried out at a temperature below the reflux temperature of the reaction mixture, whereby said malononitrile is reduced to aminomalononitrile;
   b. separating any aniline present in the reaction mixture and then separating aminomalononitrile from the reaction mixture; and
   c. adding a strong acid to the aminomalononitrile to form the corresponding salt thereof.

6. A process in accordance with claim 5 wherein the stong acid is a member selected from the group consisting of hydrogen chloride, hydrogen bromide and p-toluene sulfonic acid.

7. A process for preparing aminomalononitrile which comprises reacting an etheral solution of a malononitrile selected from the group consisting of oximinomalononitrile and phenazomalononitrile with zinc in an aqueous acidic medium, the initial molar ratio of zinc to malononitrile being between about 2 to 1 and about 2.5 to 1, and said reaction being carried out at a temperature below the reflux temperature of the reaction mixture.

8. A process for preparing aminomalononitrile salts which comprises:
   a. reacting an ethereal solution of a malononitrile selected from the group consisting of oximinomalononitrile and phenazomalononitrile with zinc in an aqueous acidic medium, the initial molar ratio of zinc to malononitrile being between about 2 to 1 and about 2.5 to 1, and said reaction being carried out at a temperature below the reflux temperature of the reaction mixture, whereby said malononitrile is reduced to aminomalononitrile;
   b. separating aminomalononitrile from the reaction mixture after separating out any aniline first formed; and
   c. adding a strong acid to the aminomalononitrile to form the corresponding salt thereof.

9. A process for preparing aminomalononitrile which comprises reacting in an aqueous medium an etheral solution of a malononitrile selected from the group consisting of oximinomalononitrile and phenazomalononitrile with a reducing agent selected from the group consisting of sodium dithionite and potassium dithionite dissolved in water, the initial molar ratio of reducing agent to malononitrile being between about 2 to 1 and about 3 to 1, and said reaction being carried out at a temperature below the reflux temperature of the reaction mixture.

10. A process for preparing aminomalononitrile salts which comprises:
   a. reacting in an aqueous medium an ethereal solution of a malononitrile selected from the group consisting of oximinomalononitrile and phenazomalononitrile with a reducing agent selected from the group consisting of sodium dithionite and potassium dithionite dissolved in water, the initial molar ratio of reducing agent to malononitrile being between about 2 to 1 and about 3 to 1, and said reaction being carried out at a temperature below the reflux temperature of the reaction mixture, whereby said malononitrile is reduced to aminomalononitrile;
   b. separating any aniline formed and then separating out the animonalononitrile from the reaction mixture; and
   c. adding a strong acid to said aminomalononitrile to form the corresponding salt thereof.

* * * * *